2,902,522

DEHYDROGENATION PROCESS AND CATALYST

James R. Owen, Bartlesville, Okla., assignor to Phillips Petroleum Company, a corporation of Delaware No Drawing. Application March 29, 1957
Serial No. 649,288

10 Claims. (Cl. 260—680)

This invention relates to an improved process for the dehydrogenation of organic compounds and to the catalyst used therein. In another aspect this invention relates to a method of preparing olefins and diolefins from the corresponding paraffins using an improved dehydrogenation catalyst. In one of its more specific aspects this invention relates to the dehydrogenation of steam-diluted butane to produce butylene and butadiene.

In the dehydrogenation of paraffins to the corresponding olefins and diolefins steam is a valuable diluent when employing catalysts that are not seriously poisoned by water vapor. Catalysts which are sufficiently resistant to poisoning of this kind to make practicable steam-diluted dehydrogenation processes have shown a tendency to decline in activity when used at elevated temperatures over prolonged periods. Although this decline in activity may not justify discarding or frequently regenerating the catalyst, the overall result is a reduced yield of desired products.

I have discovered an improved method for dehydrogenating steam-diluted butane to butylene and butadiene by employing a catalyst comprising the oxides of chromium, vanadium and thorium. I have found that this particular catalyst unexpectedly exhibits essentially no activity decline with use. In this respect the catalyst of my invention is superior to suitable steam-diluted dehydrogenation catalysts of the prior art. Broadly, my improved catalyst can be used to dehydrogenate any dehydrogenatable organic compound, including compounds such as aliphatic hydrocarbons both alkanes and alkenes, cycloaliphatic hydrocarbons, alcohols, and the like. My process can also be used to dehydrogenate the alkyl substituent of alkylated aromatic and heterocyclic nitrogen-base compounds.

It is an object of this invention to provide a method of dehydrogenating paraffins to the corresponding olefins and diolefins. It is another object of this invention to provide a catalyst which does not exhibit a decline in activity with use when employed in steam-diluted dehydrogenation processes. It is still another object of my invention to provide an improved process of steam-diluted dehydrogenation of organic compounds wherein increased yields of the desired products can be obtained over prolonged periods. It is still another object of my invention to provide an improved process and catalyst for the steam-diluted dehydrogenation of butane to butylene and butadiene. Other objects, advantages and features of my invention will be apparent to those skilled in the art in the following description, examples and claims.

The use of water vapor as a diluent in dehydrogenation reactions has many advantages which are known in the art. Steam is used in these processes to minimize coking of the catalyst, as a heat carrier, and as a diluent to increase the thermodynamic ceiling. The diluent can be cheaply provided and is readily available. It can also be easily removed from a hydrocarbon stream by simple condensation. By the use of a steam diluent, operational pressures can be at atmospheric or above, thereby preventing leakage of air into the system; and at the same time a low absolute or partial pressure of the reacting materials is maintained. Processes of this type are fully described in the patent of Dague and Myers, U.S. 2,500,920, issued March 21, 1950.

The process of my invention can be successfully applied to dehydrogenate various aliphatic and cycloaliphatic hydrocarbons as well as the alkyl substituents of alkylated aromatic and heterocyclic nitrogen compounds. For example, compounds which can be suitably dehydrogenated are alkanes, especially the lower alkanes having from about three to eight carbon atoms per molecule, to form the corresponding olefins and diolefins. Alkenes can be used as a starting material; or, as is often the case, the alkane is used and the resultant product is a mixture of olefins and diolefins. The preferred reaction of my invention is the dehydrogenation of paraffins having from four to five carbon atoms, especially the dehydrogenation of butane to butylene and butadiene. Examples of other possible reactions are the dehydrogenation of cyclohexane to cyclohexene, and ultimately to benzene; the alkyl alcohols to the corresponding aldehydes; ethylbenzene to styrene, methylethylpyridine to methylvinylpyridine, and the like. Multiple dehydrogenation can and frequently does occur, as in the formation of benzene from cyclohexane and diolefins from saturated paraffins.

The catalyst of my invention comprises chromia, vanadia and thoria and can be prepared by any of several methods known in the art. For example, the catalyst can be prepared by mixing the powdered components or by co-precipitation of the components as gel with subsequent ignition to the oxides. The catalyst can be used in the form of granules of approximately 5 to 60 mesh size, in the form of pills or pellets, in the form of fluidized powder, or in the form of dust suspened in the feed. Chromium oxide is generally present in the range of about 10 to 65 weight percent of the total catalyst. Vanadium oxide is generally present in about 25 to 50 weight percent of the total catalyst and the thoria can range from about 5 to 65 weight percent of the catalyst. In the preferred compositions the amount of each oxide is within the range of about 25 to 50 weight percent of total catalyst although I have found that the relative compositions of each oxide can be varied considerably without appreciably affecting the activity of the catalyst as a whole. This fact is well borne out by the example shown in the specification.

In the operation of my invention for the preparation of butylene and butadiene from normal butane, the butane is admixed with steam in the ratio of about 10 volumes of steam per volume of paraffin. The mixture is heated to the conversion temperature and passed into contact with the catalyst. The effluent from the dehydrogenation zone is processed in a known manner for the separation of substantially pure olefins and diolefins. The olefins can be then separately dehydrogenated in a known manner for conversion to diolefins. The unconverted paraffins are recycled to the dehydrogenation step. If desired, the diolefins can be separated from the effluent, and the olefins together with unreacted paraffins recycled to the dehydrogenation step.

Preferred conditions for the dehydrogenation of steam-diluted paraffins in accordance with this invention include a temperature in the range of about 1000 to 1400° F., an absolute pressure of about 1 to 3 atmospheres and a hydrocarbon space velocity of about 200 to 700 gaseous volumes at standard temperature and pressure per volume of catalyst per hour. The volume ratio of steam to hydrocarbon is generally about 1 to 20 volumes of steam per volume of hydrocarbon and preferably about 5 to 15 volumes of steam per volume of hydrocarbon. The steam and the hydrocarbon can be mixed before charging to the reaction zone or the steam can be separately injected at a plurality of points along the reaction zone. It is preferred to preheat the steam to a temperature at least as high as that employed in the reaction and in some cases it is advantageous to preheat the hydrocarbons for mixing with the steam. It is sometimes desirable to preheat the steam to a temperature somewhat above the desired conversion temperature and to admix the preheated steam with preheated paraffin at a temperature slightly below the desired reaction temperature such that the resulting mixture attains the reaction temperature. The effluent from the reaction zone is cooled to condense and remove steam, and the individual hydrocarbon components are separated by a conventional method, such as fractionation, solvent extraction, or the like.

While it is common in prior art processes of this type to experience a decline in catalyst activity when the same catalyst is employed over prolonged periods, such is not the case for the catalyst of my invention, as is well illustrated in the specific example shown below. The reactants, and their proportions, and other specific ingredients and conditions are presented as being typical and should not be construed to limit the invention unduly.

EXAMPLE

Butane was dehydrogenated to yield butene and butadiene in 21 eight-hour dehydrogenation periods at 1125° F. and at a space velocity of 400 volumes of butane per volume of catalyst per hour. Butane was diluted with steam at a ratio of 12 mols of steam per mol of butane. The process was duplicated employing a chromia-vanadia-gamma alumina catalyst of the prior art and three chromia-vanadia-thoria catalysts of my invention having various proportions of ingredients. The yield of butenes plus butadiene in cycles 1, 10 and 21 for each catalyst is shown in Table I.

Table 1
COMPARISON OF ACTIVITY RETENTION FOR CHROMIA-VANADIA-THORIA CATALYST WITH CHROMIA-VANADIA-GAMMA ALUMINA CATALYST IN DEHYDROGENATION OF STEAM-DILUTED BUTANE

| Catalyst, weight percent | | | | Yield [1] (mol percent) | | | Selectivity [2] (percent) | | |
|---|---|---|---|---|---|---|---|---|---|
| Chromia | Vanadia | Alumina | Thoria | Cycle | | | Cycle | | |
| | | | | 1 | 10 | 21 | 1 | 10 | 21 |
| 50 | 25 | 25 | ---- | 12-13 | 11 | 7 | 64 | 60 | 55 |
| 50 | 25 | ------ | 25 | 10-11 | 10-11 | 10-11 | 55 | 55 | 55 |
| 25 | 50 | ------ | 25 | 14 | 11 | 11 | 55 | 55-57 | 57 |
| 25 | 25 | ------ | 50 | 10 | 10 | 10 | 55 | 55-57 | 57 |

[1] Mol percent of feed converted to butene and butadiene.
[2] Mols of butene plus butadiene per 100 mols of butane converted.

As shown by the above data a decrease in yield and selectivity is evident for the catalyst of the prior art comprising chromia, vanadia, and alumina; whereas the catalyst of my invention exhibited substantially no decline in activity throughout the runs. Intermediate values indicate that the initially high yield value of (14) for the catalyst containing 50 percent vanadia can be discounted somewhat. Thus substantially no decline in activity for the chromia-vanadia-thoria catalyst was apparent. It is very significant that the catalyst of my invention at the end of 21 eight-hour cycles had the same degree of activity as was initially present.

As will be evident to those skilled in the art, various modifications of this invention can be made, or followed, in the light of the foregoing disclosure and discussion, without departing from the spirit or scope thereof.

I claim:

1. A process for catalytically dehydrogenating paraffin hydrocarbons having from 3 to 8 carbon atoms per molecule in the presence of steam with substantially no decline in catalyst activity with use which comprises contacting said hydrocarbon with a catalyst consisting essentially of vanadia, chromia, and thoria, said catalyst being from 25 to 50 weight percent vanadia, from 10 to 65 weight percent chromia and from 5 to 65 weight percent thoria, under dehydrogenating conditions which include a temperature in the range of about 1000 to 1400° F., an absolute pressure of about 1 to 3 atmospheres, a volume ratio of steam to hydrocarbons of about 1 to 20 volumes of steam per volume of hydrocarbon and a hydrocarbon space velocity of about 200 to 700 gaseous volumes measured at standard temperature and pressure per volume of catalyst per hour.

2. A process for catalytically dehydrogenating butane to butylene and butadiene in the presence of steam with substantially no decline in catalyst activity with use which comprises contacting said butane with a catalyst consisting essentially of vanadia, thoria and chromia, each component being present in an amount in the range of about 25 to 50 weight percent of the total catalyst under dehydrogenating conditions which include a temperature in the range of about 1000 to 1400° F., an absolute pressure of about 1 to 3 atmospheres, a volume ratio of steam to hydrocarbons of about 1 to 20 volumes of steam per volume of hydrocarbon and a hydrocarbon space velocity of about 200 to 700 gaseous volumes measured at standard temperature and pressure per volume of catalyst per hour.

3. An improved catalyst which does not decline in activity when used in dehydrogenation of steam-diluted butane consisting essentially of chromia, vanadia, and thoria, each component being present in about 25 to 50 weight percent of the total catalyst.

4. A process for catalytically dehydrogenating paraffin hydrocarbons having from 3 to 8 carbon atoms per molecule in the presence of steam with substantially no decline in catalyst activity with use which comprises contacting said hydrocarbon with a catalyst consisting essentially of vanadia, chromia, and thoria, said catalyst being from 25 to 50 weight percent vanadia, from 10 to 65 weight percent chromia and from 5 to 65 weight percent thoria, under dehydrogenating conditions and in the presence of steam.

5. A process according to claim 4 wherein said dehydrogenating conditions include a temperature in the range of about 1000 to 1400° F.

6. A process for catalytically dehydrogenating a dehydrogenatable organic compound selected from the group consisting of hydrocarbons, alcohols and heterocyclic nitrogen-base compounds by removing two hydrogen atoms from the molecule to produce a double bond which comprises contacting said organic compound under dehydrogenating conditions with a catalyst whose active portion consists essentially of about 25 to 50 weight percent vanadium oxide, about 10 to 65 weight percent chromium oxide, and about 5 to 65 weight percent thorium oxide.

7. A process according to claim 6 wherein said contacting step is carried out in the presence of steam.

8. A process for catalytically dehydrogenating a dehydrogenatable hydrocarbon to produce a carbon to carbon double bond in the molecule which comprises contacting said hydrocarbon under dehydrogenating conditions and in the presence of steam with a catalyst whose active portion consists essentially of about 25 to 50 weight percent vanadium oxide, about 10 to 65 weight percent chromium oxide, and about 5 to 65 weight percent thorium oxide.

9. A process according to claim 8 wherein said hydrocarbon is a paraffin and said dehydrogenating conditions include a temperature in the range of about 1000 to 1400° F.

10. An improved dehydrogenation catalyst consisting essentially in its active portion of about 25 to 50 weight percent vanadia, about 10 to 65 weight percent chromia, and about 5 to 65 weight percent thoria.

References Cited in the file of this patent

UNITED STATES PATENTS

| | | |
|---|---|---|
| 1,701,075 | Jaeger et al. | Feb. 9, 1929 |
| 2,344,318 | Mattox | Mar. 14, 1944 |
| 2,377,113 | Thomas | May 29, 1945 |
| 2,409,587 | Ramage | Oct. 15, 1946 |
| 2,576,034 | Myers | Nov. 20, 1951 |
| 2,794,053 | Altreuter et al. | May 28, 1957 |